April 10, 1945.  C. R. LEMONIER  2,373,575
CONTROL MECHANISM FOR AIRCRAFT
Filed Oct. 3, 1942  2 Sheets-Sheet 1
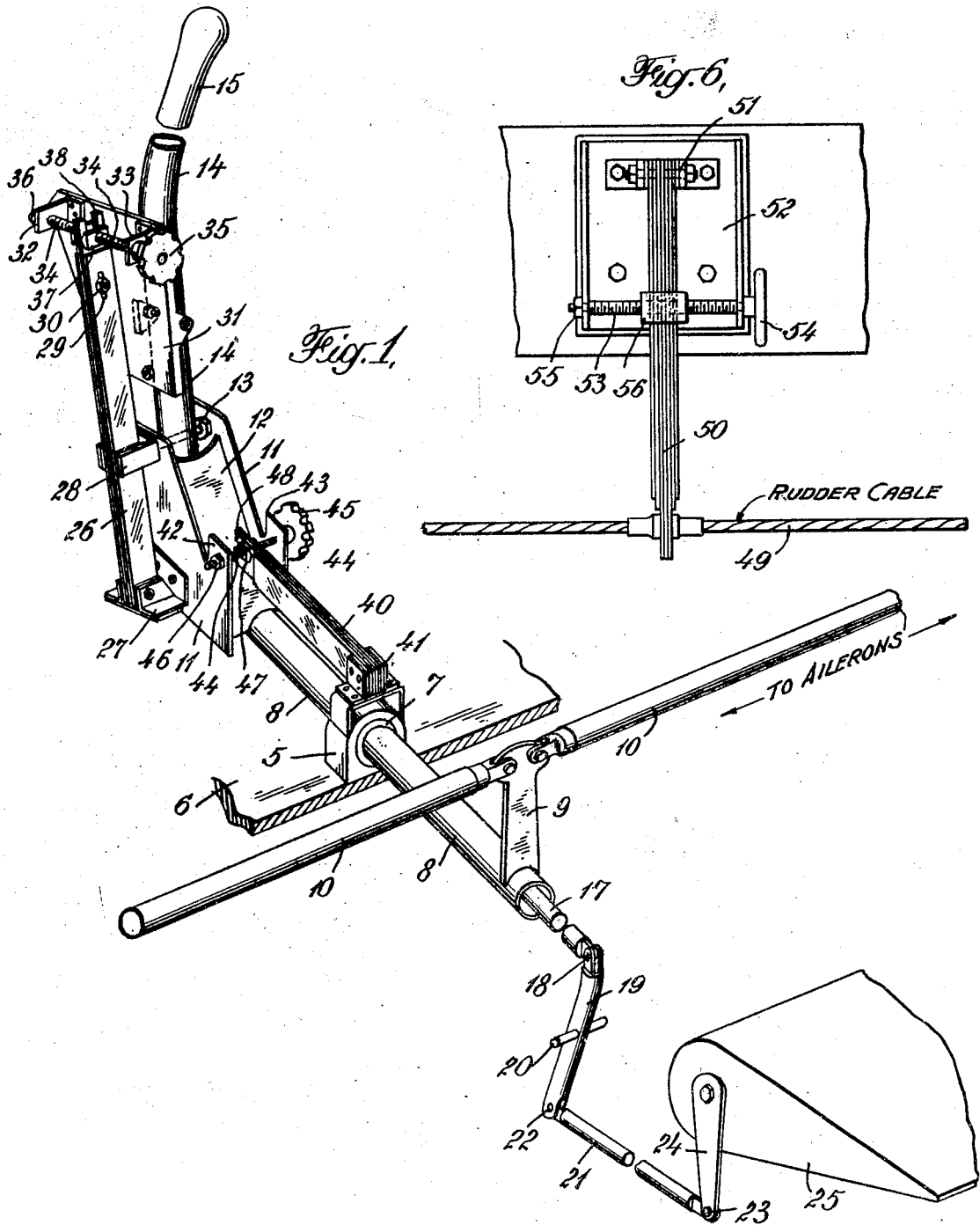
INVENTOR
Camille R Lemonier
BY
ATTORNEYS

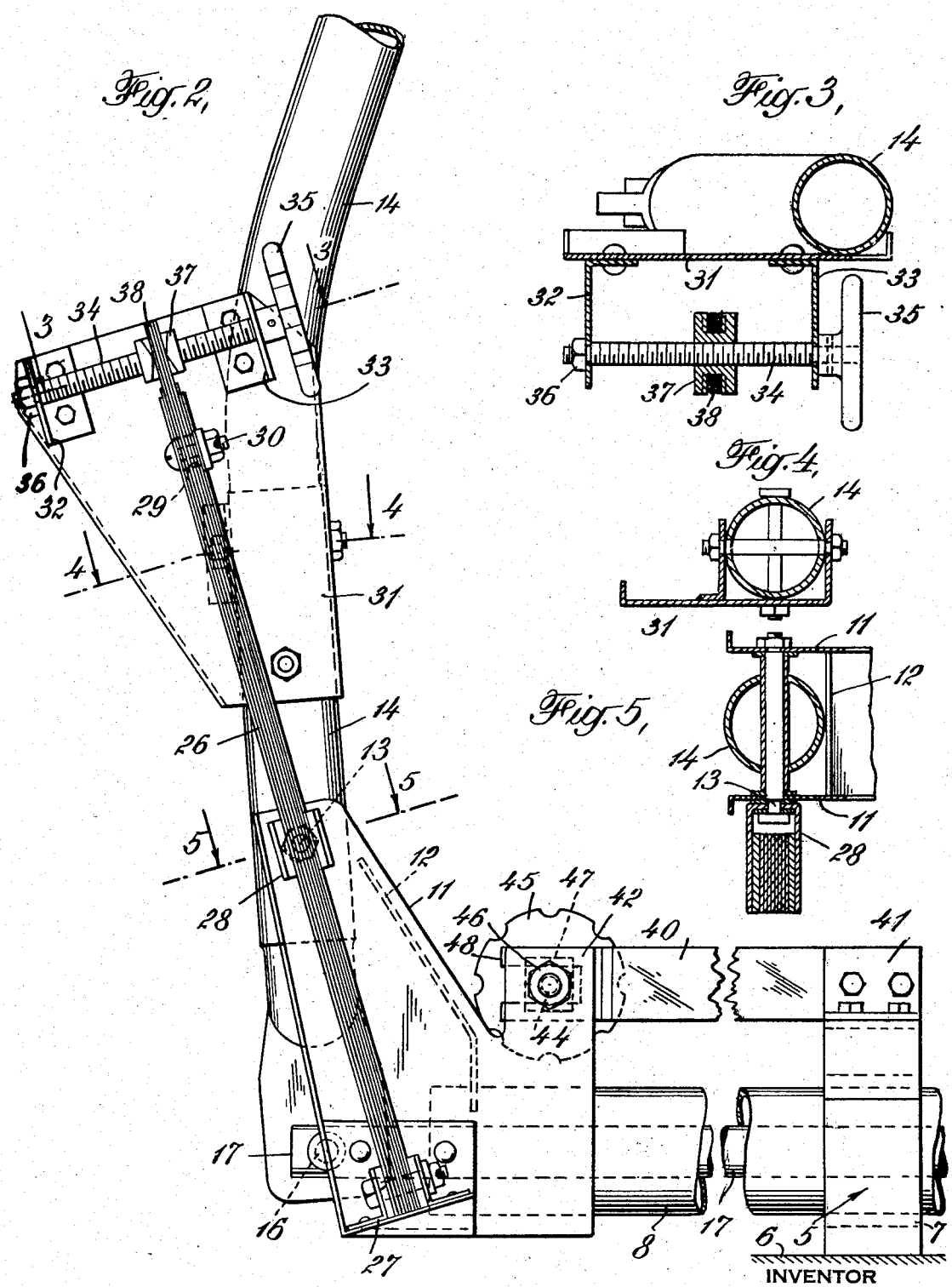

Patented Apr. 10, 1945

2,373,575

UNITED STATES PATENT OFFICE 2,373,575

CONTROL MECHANISM FOR AIRCRAFT

Camille R. Lemonier, East Aurora, N. Y., assignor, by mesne assignments, to Reconstruction Finance Corporation Application October 3, 1942, Serial No. 460,594

5 Claims. (Cl. 244—83)

This invention relates to control mechanism for aircraft and particularly to means for stabilizing the control devices with respect to the air pressure exerted on the control surfaces.

In conventional aircraft, the elevators and ailerons are actuated through connections with the stick which the operator moves in directions with and transverse to the longitudinal axis of the aircraft to execute desired maneuvers. The rudder is controlled by footbars connected thereto. The air pressure on the control surfaces is transmitted to the control devices. When, as is often the case, the loading of the plane is unbalanced and the plane is not in "trim," it is necessary for the operator to adjust the control devices sufficiently to provide the proper balance. The continuous air pressure transmitted to the control devices under such conditions affords a constant strain and resulting fatigue.

It is the object of the present invention to provide simple and effective means whereby the air pressure exerted on the control surfaces under the conditions described is balanced so that the operator is relieved of the necessity for holding the control devices in their adjusted positions.

Other objects and advantages of the invention will be apparent as it is better understood by reference to the following specification and the accompanying drawings, in which Fig. 1 is a view in perspective illustrating the application of the invention to the stick controlling the elevators and ailerons;

Fig. 2 is an enlarged elevation of a portion of the mechanism illustrated in Fig. 1;

Fig. 3 is a section on the line 3—3 of Fig. 2;

Fig. 4 is a section on the line 4—4 of Fig. 2;

Fig. 5 is a section on the line 5—5 of Fig. 2; and

Fig. 6 is an elevation illustrating the application of the balancing device to the rudder control.

Referring to the drawings, 5 indicates a block which may be secured to the floor 6 or other fixed part of the aircraft. The block carries a bearing 7 for a tubular member 8 which is capable of rotation in the bearing and carries an arm 9 which may be connected by links 10 to the ailerons (not shown). The linkage employed in transmitting movement to the ailerons is common in the art and need not be described in detail.

The tubular member 8 is secured to a housing consisting of plates 11 and a web 12. A pivot 13 is mounted on the plates 11 and carries a stick 14 having a handle 15. The lower end of the stick is pivoted at 16 to a tubular member 17 disposed within the tubular member 8 and extending therethrough to a pivotal connection 18 with a lever 19 which is mounted for rotation about a pivot 20. A link 21 is pivotally connected at 22 to the lever 19 and at 23 with a lever 24 which actuates an elevator 25. It will be understood that the particular linkage employed may be varied and that the connections described are merely illustrative of a suitable arrangement.

As is evident from the foregoing description, the operator, by grasping the handle 15 can shift it forwardly or backwardly and thereby through the tubular member 17 actuate the elevators 25. By shifting the handle 15 laterally, the links 10 will be actuated to modify the position of the ailerons, the tubular member 8 turning in its bearing 7 to permit the desired adjustment. These operations, as previously noted, are those commonly effected in the operation of an aircraft.

To balance the air pressure on the elevators 25, I employ a spring, preferably a leaf spring 26, the lower end of which is firmly held in a bracket 27 secured to one of the plates 11. A clip 28 is fastened to the plate 11 near the upper edge thereof and grips the spring 26 firmly. The leaves of the spring are preferably slotted at 29 and secured by a bolt 30 to avoid separation. A bracket 31 is secured to the stick 14 and is provided with wings 32 and 33 to receive a screw 34 having a hand wheel 35 at one end and a nut 36 at the other. A collar 37 is threadedly mounted on the screw 34 to receive the bifurcated end 38 of the spring 26.

In the operation of the device, the screw 34 is turned by means of the hand wheel 35 to adjust the position of the collar 37 so that the spring 26 is under tension and opposes the air pressure transmitted from the elevators 25 to the stick. By proper adjustment of the tension in the spring 26, the air pressure may be balanced and canceled. Thus, when the stick 14 is moved forwardly or backwardly to trim the ship, the air pressure, being balanced by the tension of the spring, will not tend to return the stick and the stick will remain in adjusted position even though the operator may release it.

To effect a similar result with respect to the ailerons, a leaf spring 40 is mounted at 41 on the block 5. Wings 42 and 43 on the plates 11 support a screw 44, carrying a hand wheel 45 at one end and a nut 46 at the other. A collar 47 is threadedly mounted on the screw 44 to receive the bifurcated end 48 of the spring 40. By turning the hand wheel 45, the spring may be made to balance forces exerted by the air on the ailerons and to cancel those forces. Consequently when the operator moves the stick 14 to the right or left to trim the ship, the stick will remain in its adjusted position and the operator need not hold it to maintain the desired adjustment of the ailerons.

The invention is applicable also to the operation of the rudder which is normally connected by cables to rudder bars which are actuated by the feet of the operator. The usual construction is well known in the art and is not illustrated in detail. To apply the invention, the rudder cable 49 is connected to a leaf spring 50 which is supported at 51 in brackets on a member 25 which may be mounted on any fixed part of the aircraft. A screw 53 is mounted on the member 52 and carries a hand wheel 54 and nut 55. A collar 56 is threadedly supported on the screw and engages the spring 50. By properly adjusting the screw 53, the spring 50 may be tensioned to provide a force which will neutralize the force exerted by the air on the rudder (not shown). Thus the rudder when adjusted will remain in the desired position.

The mechanism as described is simple and effective. Through its use, the operator may be relieved of the fatiguing necessity for the constant exertion of force on the controlling mechanism of the aircraft to maintain the ship in trim. The fatigue incidental thereto is avoided.

Various changes may be made in the form, arrangement and construction of the parts without departing from the invention or sacrificing any of the advantages thereof.

I claim:

1. In an aircraft, a control surface, an actuating member, connections between the control surface and the actuating member, including a reciprocable member, a tubular member surrounding a part of said reciprocable member and mounted for movement about its axis, a leaf spring having one portion secured to the tubular member and a second portion extending to a position adjacent the actuating member and arranged to exert a biasing force thereon in a direction to oppose a counterforce exerted on the control surface and transmitted to the actuating member by the reciprocable member, and means for adjusting the tension of said spring, whereby the force exerted by it on the actuating member can be adjusted to equal and cancel counterforces of varying intensities exerted on the control surface.

2. In an aircraft, a control surface, an actuating member, connections between the control surface and the actuating member, including a reciprocable member, a tubular member surrounding a part of said reciprocable member and mounted for movement about its axis, a housing carried by the rotatable tubular member and movable therewith, a leaf spring having one portion rigidly secured to said housing and a second portion extending to a position adjacent the actuating member and arranged to exert a biasing force thereon in a direction to oppose a counterforce exerted on the control surfaces and transmitted to the actuating member by the reciprocable member, and means, including adjustable screw means, for adjusting the biasing force exerted by said spring, whereby the force exerted by it on the actuating member can be adjusted to equal and cancel counterforces of varying intensities exerted on the control surface.

3. In an aircraft, a plurality of control surfaces, an actuating member, connections between one of the control surfaces and the actuating member, including a rotatable tubular member, connections between another control surface and the actuating member including a second member extending through the tubular member and arranged for reciprocable movement, a leaf spring having one portion rigidly secured to the aircraft and a portion so arranged as to exert a biasing force on the tubular member, tending to rotate it, said biasing force operating through the tubular member on the actuating member, a second leaf spring having one portion secured to the tubular member and a second portion extending to a position adjacent the actuating member and arranged to exert a biasing force thereon, the tension of the springs being exerted in directions to oppose forces exerted on said control surfaces and transmitted to the actuating member, and means for adjusting the tension of said springs, whereby the biasing forces exerted by the springs on the actuating member can be caused to cancel forces transmitted thereto from said control surfaces.

4. In an aircraft, a plurality of control surfaces, an actuating member, connections between one of the control surfaces and the actuating member, including a rotatable tubular member, connections between another control surface and the actuating member including a second member extending through the tubular member and arranged for reciprocable movement, a leaf spring having one portion rigidly secured to the aircraft and a portion so arranged as to exert a biasing force on the tubular member, tending to rotate it, said biasing force operating through the tubular member on the actuating member, a second leaf spring having one portion secured to the tubular member and a second portion extending to a position adjacent the actuating member and arranged to exert a biasing force thereon, the tension of the springs being exerted in a direction to oppose forces exerted on said control surfaces and transmitted to the actuating member, means carried by the tubular member for adjusting the tension of said first spring, and means carried by the actuating member for adjusting the tension of said second spring, whereby the biasing forces exerted by the springs on the actuating member can be caused to cancel forces transmitted thereto from said control surfaces.

5. In an aircraft, a plurality of control surfaces, an actuating member, connections between one of the control surfaces and the actuating member, including a rotatable tubular member, connections between another control surface and the actuating member, including a second member extending through the tubular member and arranged for reciprocable movement, a housing carried by the rotatable tubular member and movable therewith, a leaf spring having one portion rigidly secured to said housing and a second portion extending to a position adjacent the actuating member and arranged to exert a biasing force thereon to hold it in an adjusted position against a counterforce exerted on said second-named control surface and transmitted to the actuating member by said reciprocable member, a second leaf spring having one portion secured to the aircraft and a second portion so arranged as to exert a biasing force on the tubular member tending to rotate it, said biasing force operating through the tubular member on the actuating member, the biasing force of the springs being exerted in directions to oppose forces exerted on said control surfaces and transmitted to the actuating member, and means for adjusting the biasing force exerted by said springs, whereby the biasing forces exerted by the springs on the actuating member can be caused to cancel forces transmitted thereto from said control surfaces.

CAMILLE R. LEMONIER.